US008767957B1

(12) United States Patent
Bagchi et al.

(10) Patent No.: US 8,767,957 B1
(45) Date of Patent: Jul. 1, 2014

(54) COMMUNICATION ENCRYPTION METHOD AND DEVICE

(75) Inventors: Saurabh Bagchi, West Lafayette, IN (US); Shammi R. Didla, West Lafayette, IN (US); Aaron C. Ault, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 1442 days.

(21) Appl. No.: 12/327,025

(22) Filed: Dec. 3, 2008

Related U.S. Application Data

(63) Continuation-in-part of application No. 12/261,016, filed on Oct. 29, 2008, now abandoned.

(60) Provisional application No. 60/983,335, filed on Oct. 29, 7.

(51) Int. Cl.
*H04L 29/06* (2006.01)

(52) U.S. Cl.
USPC ............................... 380/29; 380/28; 717/151

(58) Field of Classification Search
USPC .......................................................... 380/29
See application file for complete search history.

(56) References Cited

U.S. PATENT DOCUMENTS

| 2005/0185790 | A1* | 8/2005 | Le Quere ..................... 380/28 |
| 2006/0072746 | A1* | 4/2006 | Tadepalli ..................... 380/37 |
| 2007/0258508 | A1* | 11/2007 | Werb et al. ................... 375/140 |

OTHER PUBLICATIONS

Tillich, S., Großschädl, J.: Instruction Set Extensions for Efficient AES Implementation on 32-bit Processors, In: Goubin, L., Matsui, M. (eds.) CHES 2006, LNCS, vol. 4249, pp. 270-284, Springer, Heidelberg (2006).*
Law, Y., Doumen, J., Hartel, P.: Benchmarking block ciphers for wireless sensor networks. In: IEEE International Conference on Mobile Ad-hoc and Sensor Systems. (2004) 447-456.*
Kothari NB, Sudarshan TSB, Gurunarayanan S, et al. SOC design of a low power wireless sensor network node for Zigbee systems. Proceedings of International Conference on Advanced Computing and Communications, Dec. 20-23, 2006, Surathka, India. Piscataway, NJ, USA: IEEE, 2006: 462-466.*
Hollestelle, Gijs, Wouter Burgers, and J. I. den Hartog. "Power analysis on smartcard algorithms using simulation." (2004).*

(Continued)

*Primary Examiner* — Vu Le
*Assistant Examiner* — Tracy Mangialaschi
(74) *Attorney, Agent, or Firm* — Maginot, Moore & Beck, LLP (57) ABSTRACT

An encryption method and device employing a modified low-resource AES algorithm. The algorithm in one embodiment has a 128-bit key and a 16-bit data type, along with optimization functions including function inlining, memory move reduction via multiple transformations on a given state during a given iteration of a main loop of the algorithm, pointer-based accessing of the state from a transformation function, and a global key schedule. Another embodiment of the invention is a low-power secure communication device comprising a ZigBee-compliant transceiver having a maximum over-the-air data rate of 250 kbps, and a 16-bit RISC encryption processor configured to implement an AES algorithm adapted to encrypt data at a faster rate than 250 kbps. The AES algorithm only requires about 5000 bytes of ROM and about 250 bytes of RAM. The disclosed implementation of AES in a high-level language (C in this case) is believed to be the first software-based solution for 16-bit microcontrollers capable of matching the communication rate of 250 kbps specified by the Zigbee protocol, while also minimizing RAM and ROM usage.

5 Claims, 4 Drawing Sheets

(56) References Cited

OTHER PUBLICATIONS

Healy, M., Newe, T., & Lewis, E. (Jul. 2007). Efficiently securing data on a wireless sensor network. In Journal of Physics: Conference Series (vol. 76, No. 1, p. 012063). IOP Publishing.*

Uma, Tug. "D4. 2 Security services and primitives for EP2P systems." (2007).*

Advanced Encryption Standard (AES), Federal Information Processing Standards Publication 197, Nov. 2001 (51 pages).

Duh, D-R et al., "An Implementation of AES Algorithm With the Multiple Spaces Random Key Pre-Distribution Scheme on MOTE-KIT 5040," *Proceedings of the IEEE International Conference on Sensor Networks, Ubiquitous, and Trustworthy Computing (SUTC '06)*, Jun. 5-7, 2006, Washington, D.C., vol. 2—Workshops, pp. 64-71.

Dworkin, M., "Recommendation for Block Cipher Modes of Operation: Methods and Techniques," National Institute of Standards and Technology Special Publication 800-38A, Dec. 2001, 66 pgs.

Dworkin, M., "Recommendation for Block Cipher Modes of Operation: The CMAC Mode for Authentication," National Institute of Standards and Technology Special Publication 800-38B, May 2005, 25 pgs.

Karthikeyani, S., "IEEE 802.15.4™ and ZigBee™ Hardware Platform using MSP430F1612," *Texas Instruments Application Report SLAA264*, Sep. 2005, 7 pgs.

Law, Y.W. et al., "Survey and Benchmark of Block Ciphers for Wireless Sensor Networks," *ACM Transactions on Sensor Networks*, vol. 2, No. 1, Feb. 2006, pp. 65-93.

Vitaletti, A. et al., "Rijndael for Sensor Networks: Is Speed the Main Issue?," *Electronic Notes in Theoretical Computer Science*, vol. 171, No. 1, Apr. 14, 2007, pp. 71-81.

Nadeem, A. et al., "A Performance Comparison of Data Encryption Algorithms," *First International Conference on Information and Communication Technologies, 2005.* Aug. 27-28, 2005, Karachi, Pakistan, pp. 84-89.

Astarloa, A. et al., "Multi-architectural 128 bit AES-CBC Core based on Open-Source Hardware AES Implementations for Secure Industrial Communications," *International Conference on Communication Technology, 2006*, Nov. 29-Dec. 1, 2006, St. Thomas, US Virgin Islands, pp. 1-5.

Lu, C-F et al., "Fast Implementation of AES Cryptographic Algorithms in Smart Cards,"*IEEE 37th Annual 2003 International Carnahan Conference on Security Technology*, Oct. 14-16, 2003, Taipei, Taiwan, ROC, pp. 573-579.

Chao, J et al., "DES Implementation in Texas Instruments MSP430 Microcontroller," undated, 16 pgs.

Underwood, S., "mspgcc A Port of the GNU Tools to the Texas Instruments MSP430 Microcontrollers," © 2003 Steve Underwood, 55 pgs.

Gay, D. et al., "The nesC Language: A Holistic Approach to Networked Embedded Systems," *PLDI'03*, Jun. 9-11, 2003, San Diego, California, pp. 1-11.

"MSP430 Optimizing C/C++ Compiler V 2.0.1 User's Guide," © 2006 Texas Instruments Incorporated, 301 pgs.

Gladman, B., "A Specification for Rijndael, the AES Algorithm," c. Sep. 12, 2003, 37 pgs.

Chipcon Products CC2420 Data Sheet, © 2012 Texas Instruments Incorporated, 92 pgs.

Tillich, S. et al., An Instruction Set Extension for Fast and Memory-Efficient AES Implementation, *Communications and Multimedia Security*, J. Dittmann, S. Katzenbeisser and A. Ulh (Eds.), © 2005 International Federation for Information Processing, pp. 11-21.

"Advanced Encryption Standard," [online], undated, [retrieved Oct. 28, 2008]. Retrieved from the Internet: http://en.wikipedia.org/wild/Advanced_Encryption_Standard, 9 pgs.

Pereira, R., "ZigBee and ECC Secure Wireless Networks," [online], © 2006 Penton Media, Inc., [retrieved Oct. 28, 2008]. Retrieved from the Internet: http://electronicdesign.com/Articles/Print.cfm?ArticleID=8369, 2 pgs.

Reddy, J., "ZigBee Security," © 2004 ZigBee™ Alliance, 15 pgs.

Gladman, AES_H code, Sep. 9, 2006, copyright 1998-2008.

Gladman, Low Resource AES code, Sep. 9, 2006, copyright 1998-2008.

* cited by examiner

COMMUNICATION ENCRYPTION METHOD AND DEVICE

CROSS-REFERENCE TO RELATED APPLICATIONS

This application is a continuation-in-part of patent application Ser. No. 12/261,016, filed Oct. 29, 2008 now abandoned, and claims the benefit of Provisional Patent Application No. 60/983,335, filed Oct. 29, 2007. Both of these related applications are hereby incorporated by reference along with all references cited therein.

BACKGROUND OF THE INVENTION

This invention relates to secure communication methods and devices, and more particularly to methods and devices for encryption of data in communication systems.

The proliferation of wireless sensor networks (WSN) in recent years has prompted increased interest in secure communications for embedded devices. Wireless sensor nodes are inherently resource-constrained in terms of processor speed, bandwidth, energy usage, code space, and RAM size. Therefore, there is a need for secure encryption/decryption implementations that can accommodate such constraints, preferably with a small footprint while performing at speeds comparable to the radio transmission bit rate on a low-speed processor.

The Advanced Encryption Standard (AES) became the standard for encryption to protect sensitive information by all U.S. government organizations on May 26, 2002 [4]. Its inclusion in the IEEE 802.15.4 [5] standard as the standard encryption protocol for the ZigBee wireless communication protocol makes AES ideal for use in WSNs. According to the IEEE 802.15.4 specification, Low Rate—Wireless Personal Area Networks (LR-WPAN) have a maximum over the-air data rate of 250 kbps. No known software scheme is able to encrypt data using AES at a rate of 250 kbps or higher. Thus, the maximum data rate cannot be achieved with AES encrypted communication. Moreover, there has been considerable disagreement among various research groups about the performance and memory footprint of AES implementations. The memory footprint consists of RAM usage and ROM usage. RAM is often a highly constrained resource on embedded platforms (e.g., the Crossbow Mica2 mote has 4 KB and the Texas Instruments MSP430 chip has up to 10 KB). The ROM memory is used to hold the program and therefore it is desirable to limit its usage by the cryptographic functions.

Attempts have been made to produce fast implementations of AES. For example, in reference [12] cited in the list of references included herewith, Y. W. Law et al. benchmarked various block ciphers including Rijndael (AES) on a 16-bit MSP430 microcontroller. Their implementation is based on code from the open source OpenSSL library. It is heavily modified and compiled with the commercial IAR Workbench compiler. They have speed-optimized and size-optimized versions of each implementation running in Cipher-Block ChainingMode (CBC), Cipher Feedback Mode (CFB), Output Feedback Mode (OFB) and Counter Mode (CTR). Their estimate shows that AES performs best in OFB mode taking 3127 clock cycles to encrypt a 128-bit block of plaintext while taking up 12860 bytes of code memory (ROM) and 70 bytes of data memory (RAM). Their size-optimized AES implementation takes 4231 clock cycles to encrypt a 128-bit block of plaintext taking up 12616 bytes of ROM and 70 bytes of RAM.

In [14], A. Vitaletti et al. focus on the need for a compact implementation. Their implementation requires 3322 bytes in ROM and 177 bytes in RAM. However, to achieve low code size they have sacrificed performance. Their implementation takes 3.75 ms to encrypt a 128-bit block of plaintext on a 16-Bit MSP430 microcontroller running at 4 MHz.

In [6], D. R. Duh et al. implement AES on a sensor node based on the 8-bit Atmel ATmega 128L microcontroller running at 8 MHz. They based their implementation on Brian Gladman's code that was cited in the AES proposal. Their implementation can reportedly encrypt a 128-bit block of plaintext in 0.857 ms.

Texas Instruments has made available a Zigbee Stack for boards using the MSP430 with a Chipcon CC2420 transceiver chip. Even though the CC2420 has hardware support for AES, the stack includes a software implementation of the AES-128 encryption algorithm.

Figure 7:
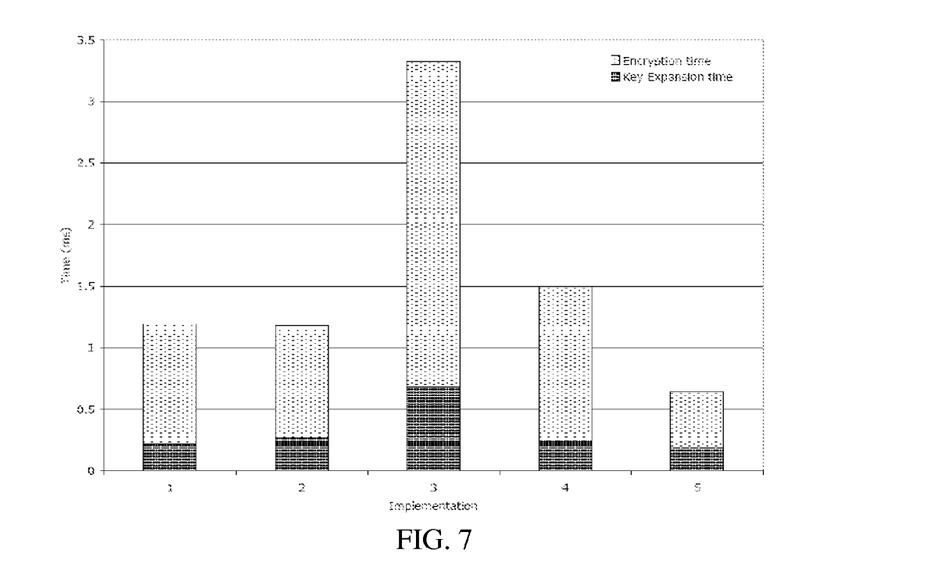
FIG. 7 is a bar graph showing encryption time plus key expansion time for an implementation according to the present invention in comparison to four other implementations.

FIG. 7 and Table 5 herein summarize the published results of each of these implementations and the results obtained during testing by the present inventors.

Advanced Encryption Standard

Rijndael Cipher, developed by Joan Daemen and Vincent Rijmen, was accepted as the Advanced Encryption Standard on Nov. 26, 2001. It is a symmetric-key block cipher with a block length of 128-bits and a flexible key length of 128, 192 or 256 bits. This section gives an overview of how AES works.

Encryption/Decryption Algorithm

Figure 1:
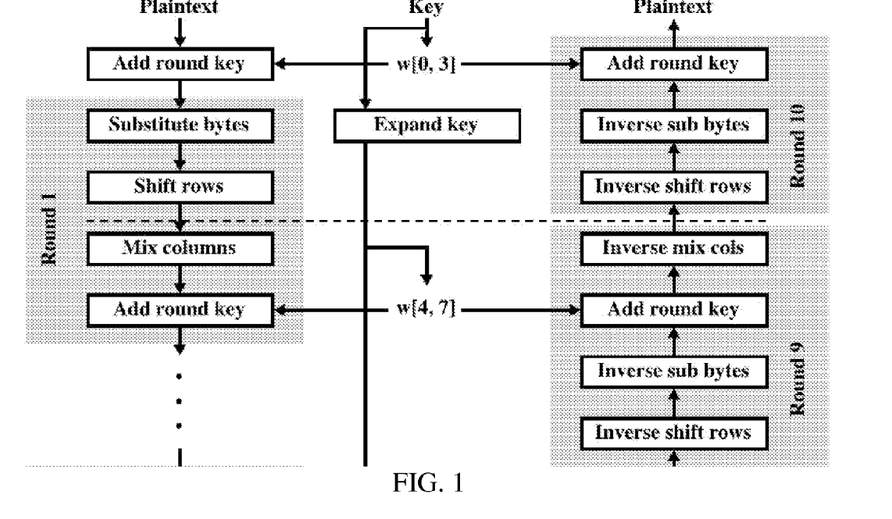
FIG. 1 is a flowchart of the overall structure of AES.

A series of permutations and substitutions are applied to the plaintext for encryption. FIG. 1 illustrates the overall structure of the algorithm [13]. There are 4 main transformations used in this process. Each transformation is applied to a 4×4 byte matrix called the State. These transformations are described below:

SubBytes: Each byte in the state is substituted by a byte from a 256-byte look-up table called the s-box.

ShiftRows: The bytes in each of the 4 rows in the state are rotated by (n−1) where n represents the row number from 1 to 4.

MixColumns: The state can be considered to be a 4×4 matrix and this transformation can be achieved by multiplying this matrix by:

$$\begin{bmatrix} 02 & 03 & 01 & 01 \\ 01 & 02 & 03 & 01 \\ 01 & 01 & 02 & 03 \\ 03 & 01 & 01 & 02 \end{bmatrix}$$

This multiplication is done in GF $(2^8)$.[1]

[1] All arithmetic in Rijndael is done in a Galois Field with 256 elements.

AddRoundKey: In this transformation, the round key is simply added to the state. In GF $(2^8)$, adding is equivalent to a bitwise exclusive-or operation.

The encryption process consists of initially applying AddRoundKey and 10, 12 or 14 rounds depending on the length of the key. Each round except the last one consists of applying the 4 transformations to the state. In the last round, only the SubBytes, ShiftRows and AddRoundKey transformations are applied.

The Key Expansion

The cipher key is expanded to generate a different key for each round. Similar to the State, the key is also considered to be a two-dimensional matrix consisting of 4 rows. Each column is considered to be a 4-byte word. The expansion is achieved by applying SubWord and RotWord transformations and addition in GF ($2^8$) of RCon[ ], a constant word array. These operations are described below:

SubWord: Similar to the SubBytes transformation, this is done by substituting each byte in the word with a byte from a 256-byte substitution box.

RotWord: This transformation cyclically shifts the bytes of a word one place upwards.

The key expansion differs slightly for 128-, 192- and 256-bit keys, but for AES-128, discussed further herein, the expanded key consists of 176-bytes (44 words). The first 4 words of the expanded key consist of the original cipher key. Every word after that is equal to the sum of the previous word and the word 4 positions earlier. For words in positions that are multiples of 4, the SubWord and RotWord transformations are applied before applying the above described exclusive-or. After the exclusive-or, another exclusive-or with the RCon[ ] associated with the round is applied.

Profiling

Table 1 below is a frequency distribution table of the different transformations in the encryption process. This serves as a good starting point in the analysis of the algorithm for optimization.

TABLE 1

Frequency of transformations in applying AES-128 to a single data block

| Procedure | Times Called |
| --- | --- |
| KeyExpand | 1 |
| SubBytes | 9 |
| ShiftRows | 9 |
| MixColumns | 8 |
| AddRoundKey | 10 |

Brian Gladman's Low-Resource Implementation

Use of Look-Up Tables

Gladman's implementation had three 256-byte look-up tables used for encryption and five 256-byte look-up tables for decryption.

Combination of Transformations

Gladman combined the MixColumns and SubBytes transformations as well as the ShiftRows and SubBytes transformations into two functions. These combinations are possible because the shifting of rows and mixing of columns are always the same and are independent of the contents of the state. A large number of memory moves are eliminated by combining these transformations with the SubBytes transformation.

Tuning Options

Gladman's code has 3 options which can be changed prior to compiling the code. These options are made possible using conditional preprocessor directives and modify the code considerably before compilation. These options can be activated/deactivated by using the #define preprocessor directive. These are briefly described below:

HAVE_MEMCPY: Defining this directs the compiler to take advantage of the memcpy function in the compiler's standard library.

HAVE_UINT32: Defining this directs the compiler to take advantage of 32-bit data types if available on the target platform.

VERSION_1: Defining this makes extensive use of local buffers within functions instead of accessing data through pointers.

IEEE 802.15.4 Security Specification

The IEEE 802.15.4 standard was first released in 2003 and revised in 2006. It includes Wireless Medium Access Control (MAC) as well as Physical layer specifications. Security is specified as part of the MAC sublayer. Since most WSNs fall within the category of LR-WPANs, compliance with this standard ensures reliability, compatibility and scalability of the network. There are a total of 8 security modes of which 4 ensure data confidentiality. These modes are listed in Table 2:

TABLE 2

Security modes specified in IEEE 802.15.4

| Level | Attribute | Confidentiality | Description |
| --- | --- | --- | --- |
| 0x00 | None | NO | No security |
| 0x01 | MIC-32 | NO | Auth (CBC-MAC) 32 bit MIC |
| 0x02 | MIC-64 | NO | Auth (CBC-MAC) 64 bit MIC |
| 0x03 | MIC-128 | NO | Auth (CBC-MAC) 128 bit MIC |
| 0x04 | ENC | YES | Enc (Counter mode AES) |
| 0x05 | ENC-MIC-32 | YES | Enc + Auth (CCM-Mode) 32 bit MIC |
| 0x06 | ENC-MIC-64 | YES | Enc + Auth (CCM-Mode) 64 bit MIC |
| 0x07 | ENC-MIC-128 | YES | Enc + Auth (CCM-Mode) 128 bit MIC |

All four modes that ensure data confidentiality use AES as the underlying block cipher function. Level 0x04 uses AES in counter mode whereas levels 0x05 through 0x07 use AES in CCM mode. Moreover, CBC-MAC is a cipher-based authentication scheme that in this case, once again, uses AES as the block cipher. For more information on AES modes of operation, refer to [7].

Therefore all security modes (except 0x00) rely on AES as the block cipher with a block length of 128 bits.

SUMMARY OF THE INVENTION

The present invention generally provides improvements in secure communication methods and devices, and more particularly provides improved methods and devices for encryption of data in communication systems.

One aspect of the present invention is an encryption method which uses a modified low-resource AES algorithm to encrypt a block of data. The modified AES algorithm has a key size of less than 200 bits and at least a 16-bit data type, and also includes at least one of the following functions: function inlining, memory move reduction via multiple transformations on a given state during a given iteration of a main loop of the algorithm, pointer-based accessing of the state from a transformation function, and a global key schedule.

According to another aspect of the present invention, a low-power secure communication device includes a ZigBee-compliant transceiver having an over-the-air data rate limited to approximately 250 kbps and a 16-bit RISC encryption processor configured to implement an AES algorithm adapted to encrypt data at a rate at least as high as the data rate of the transceiver. In one embodiment of the invention, the AES algorithm is fast enough to perform at the radio communication rate, while maintaining a relatively small memory footprint.

The objects and advantages of the present invention will be more apparent upon reading the following detailed description in conjunction with the accompanying drawings.

DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

The present inventors have developed a method by which AES can be rate matched with the radio communication speed, thus making AES practical for use in WSNs. One preferred implementation of AES achieved an encryption speed of 286 kbps and required 5160 bytes of ROM and 260 bytes of RAM. Such an encryption speed is sufficient to eliminate latency due to the encryption process in a IEEE 802.15.4-compliant WSN and therefore use AES on a continuous stream of 128-bit data blocks.

The speed of this preferred embodiment was achieved by applying various optimization techniques to Gladman's AES implementation [9] for low resource platforms. The inventors evaluated the effects of specializing the code (SPECIAL) for AES-128 by removing code that accommodates for variable key length, varying the data type (DATASZ) that holds the state and key, eliminating function calls by integrating all functional blocks into a single function (INLINE), unrolling looping constructs by taking a copy-paste approach for repeated operations (UNROLL), reducing moving data around memory by restructuring the original implementation (REDMEM), eliminating the use of local buffers to hold the state (LOCBUF), using a global variable to hold the key schedule (GLOB), generating the key for each round during the encryption process instead of precomputing it and storing it in RAM (OTFK) and using 16-bit memory writes in the MixColumns transformation (MIX16). The inventors also examined how these optimizations interact and occasionally conflict with compiler optimizations and their net effect on performance, ROM and RAM. Based on the analysis, as further discussed below, it is presently preferred to use SPECIAL, DATASZ (64-bits), INLINE, LOCBUF, REDMEM and GL-OB for best performance and additionally apply OTFK to optimize for RAM usage.

To understand how the flexibility and cost-effectiveness of the present software implementation written in C compares to the performance advantage of using a hardware implementation, comparative tests were conducted in a real-time wireless communication scenario using evaluation boards equipped with Zigbee-compliant transceiver chips. Three past attempts at optimizing AES in software that represent state-of-the-art in optimized encryption implementations for an embedded platform were also studied and evaluated. By using a common platform, a high precision oscilloscope to accurately measure time to within ±5 μs and by rigorously standardizing tests across different implementations, it was possible to reliably and quantitatively compare different implementations and evaluate their performance.

The inventors developed and tested their code on a Texas Instruments MSP430 microcontroller unit (MCU) running at 8 MHz. The MSP430 family of microcontrollers is a popular choice for several sensor nodes such as the Eyes Node [1] and the T-Mote Sky [2]. It has a 16-bit RISC core with a flexible clock system and its low power consumption of about 250 μA/MIPS-active makes it ideal for WSNs. Evaluation boards were used to interface the MSP430 to a Chipcon CC2420 transceiver chip. The CC2420 is IEEE 802.15.4 Zigbee-compliant, has an effective data rate of 250 kbps and has support for hardware MAC encryption (AES-128). This setup was used to evaluate the performance of a hardware implementation of AES and also compare it to the software solution disclosed herein.

Optimizations

Gladman's code implements AES for key sizes of 128 and 256 bits. The code also includes an on-the-fly key (OTFK) generation option. His code is used herein without any tuning options as a baseline implementation. The optimizations employed by the inventors are discussed in this section. Source code for a number of AES implementations according to the present invention is included in the Appendix. Advanced Encryption Standard (AES), FIPS PUB 197, November 2001, is incorporated herein by reference. For further background, reference is also made to Gladman's low-resource AES implementation, which is available at the http web address fp.gladman.plus.com/AES/index.htm.

Since the integrity of the AES algorithm is of prime importance, these optimizations focus on streamlining the program flow so as to achieve the same mathematical operation using fewer processor instructions. The optimized implementation is preferably in strict accordance with the AES specification. The correctness of each implementation is verified by comparing them to the test values included in the AES specification [4].

Manual Optimizations
Specialization of Code (SPECIAL)

As mentioned, the baseline implementation is a generic implementation capable of doing AES-128 as well as AES-256. This adds to the code size and hurts the performance of the key expansion process. By focusing on AES-128 and making the code less generic, we can eliminate a lot of conditional constructs and thereby substantially decrease the code size and improve performance.

Varying Data Type Size (DATASZ)

One of Gladman's tuning options is to take advantage of 32-bit data types (if available) instead of the 8-bit data types. One suitable compiler for compiling the code disclosed herein is an msp-gcc compiler based on version 3.2.3 of GNU GCC, and its largest data type is 64-bits. The use of data types larger than 16-bits is tested primarily to determine the effect on the AddRoundKey transformation, considering that the processor can exclusive-or 16-bits at a time instead of doing 8-bits at a time. The profiling data (Table 1) shows that AddRoundKey is the most frequently used transformation.

Function-Inlining (INLINE)

Function inlining is a known optimization technique in which, instead of organizing code into discrete functions which can be reused as and when required, all the functional blocks of the algorithm are coded into a single function. This eliminates the need to save the state of the function onto the stack and subsequently retrieve it. Function inlining improves performance but also increases code size if there is repeated use of code segments that perform the same set of operations on different data sets. In AES, each transformation is called only once per round. Therefore, when using a loop construct, we would hope to see only a slight increase in code size. However, if the loops are unrolled and the functions are inlined, the code size might increase substantially. To have more control over function inlining, it is done manually in the disclosed algorithm as opposed to using the compiler option.

Loop Unrolling (UNROLL)

Loop unrolling is a known optimization technique which has similar effects as function inlining. Instead of using a looping construct to iterate multiple times and use an index to perform the same operation on different sets of data, the code to perform the operation is copy-pasted multiple times. Since AES-128 has 10 rounds, 9 of which consist of the same set of transformations, any performance gain from loop unrolling will be 9-fold. Manually unrolling the loops can eliminate calculating array indices based on the loop counter. This may result in better performing code while adding substantially to the code size.

Reducing Memory Moves (REDMEM)

Figure 2:
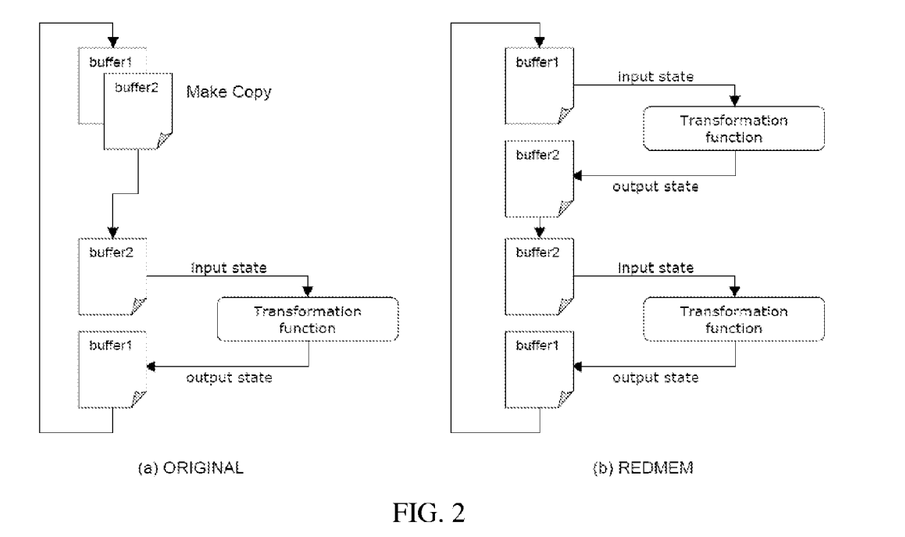
FIG. 2 is a flowchart illustrating program restructuring to reduce data date movement.

The baseline implementation has several memcpy function calls while operating on the input state. Copying of data from one memory location to another can be eliminated by structuring the code so that each transformation function saves its output in a location that is used as the input for the next transformation. This can be done by performing two sets of transformations on the state during each iteration of the main loop. This approach is illustrated in FIG. 2.

Eliminate Local Function Buffers (LOCBUF)

Figure 3:
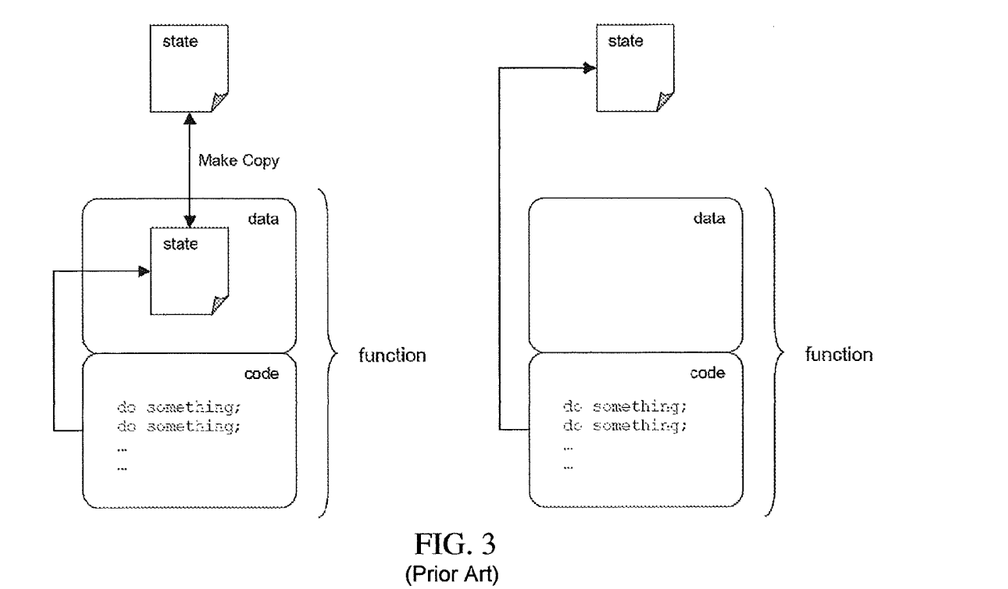
FIG. 3 is a flowchart illustrating alternative approaches to accessing a state from a function.

Gladman's code has a tuning option to either copy the state into a local buffer and then operate on it or access the state by passing a pointer to it to the transformation function. This is depicted in FIG. 3. Gladman suggested that the performance implication of having a local buffer would depend on the platform, due to the fact that different microcontrollers have different memory addressing modes.

Use of Global Variables (GLOB)

Global variables have an advantage over local variables since their address can be precomputed before runtime by the compiler. AES is very efficient in terms of memory usage. It uses a minimal amount of memory for all its transformations and can operate with the help of a 128-bit extra buffer to store the temporary state. For encryption/decryption, a 16-byte key (each byte having 8 bits, for a total of 128 bits) is expanded into a 176-byte key which can then be reused for 128-bit blocks of plaintext data. A global variable may be employed to store the 176-byte key schedule since this is accessed by multiple functions at all stages of the encryption/decryption process.

On-the-Fly-Key Generation (OTFK)

The 176-byte array that holds the above-described key accounts for a very large percentage of the RAM requirement of AES. In cases where data memory is more important that performance, the need for a 176-byte array can be eliminated by generating the key on the fly during each round. This technique becomes proportionally less efficient compared to the pre-keyed version with increasing size of the plaintext to be encrypted with the same key.

16-bitMemoryWrites in MixColumns (MIX16)

The MixColumns transformation can be implemented using XOR operations and table look-ups. Each 8-bit entry in the state is replaced by XORing four 8-bit values from pre-computed tables. To reduce the number of memory writes, one can compute a 16-bit entry for the state by using a 8-bit shift and an OR operation on two sets of four 8-bit values. The effectiveness of this optimization depends on the speed of memory writes versus the cost of bitwise-or and bitwise-shift operations. For example, if $A_8$, $B_8$ are 8-bit numbers and $v_8[\ ]$ and $v_{16}[\ ]$ are arrays of 8-bit and 16-bit elements, respectively, the statements $$v_8[0]=A_8;$$

$$v_{16}[1]=B_8;$$

have the same effect as $$v_{16}[0]=A_8|(B_8<<8);$$

Compiler Optimizations

As noted above, a suitable compiler is the msp-gcc compiler based on version 3.2.3 of GNU GCC. It includes several compiler optimizations which are broadly divided into four categories:

O1 (level 1): compiler tries to reduce code size and execution time

O2 (level 2): compiler turns on all optimizations except loop unrolling, function inlining and register renaming O3 (level 3): compiler turns on all optimizations including loop unrolling, function inlining and register renaming Os (Optimize for size): compiler turns on all O2 optimizations that do not increase code size The implementations disclosed herein are compiled with the O3 option. Since O3 turns on a large number of compiler optimizations, in some cases it cancels out the effect of manual optimizations described herein. To better understand and analyze the effects of O3, the code disclosed herein was tested with and without the use of any compiler optimizations, as further discussed below.

Development Platform

Setup

The MSP430 platform, and in particular MSP430F1611 MCU, is employed in conjunction with a DZ1611 Zigbee evaluation board commercially available from SoftBaugh Inc. [3], the evaluation board interfacing the MSP430 to a Chipcon CC2420 transceiver chip as specified in technical documentation provided by TI [11]. The MSP430F1611 has the following specifications:

Clock frequency of 8 MHz

48 KB ISP Flash ROM

10 KB RAM

Power consumption: 330 µA at 1 MHz, 2.2 V

The CC2420 has the following specifications:

2.4 GHz IEEE 802.15.4 compliant RF transceiver 250 kbps effective data rate

Low power consumption: 17.4-19.7 mA, 2.1-3.6 V 4-wire SPI interface

Serial clock up to 10 MHz

Hardware MAC encryption (AES-128)

Figure 4:
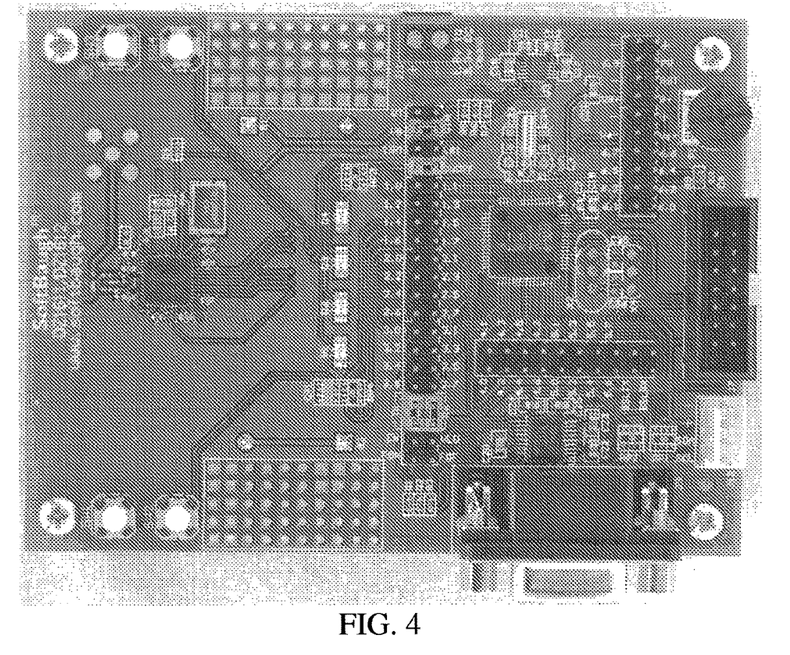
FIG. 4 is a photograph of a SoftBaugh DZ1611 Zigbee evaluation board.

All code was tested on the Softbaugh DZ1611 Zigbee demo boards (FIG. 4). The MSP430 can be programmed by either a JTAG interface provided on the board or a custom BootStrap Loader (BSL) interface. Certain changes were made to the board:

The default 6 MHz crystal oscillator was replaced with a 8 MHz crystal to get peak performance from the microcontroller.

Four pull-up resistors were added to the 4-wire SPI interface between the CC2420 and the MSP430. This was done because the CC2420 operates on active low signals.

The system was developed using the open source mspgcc toolchain. This is a port of the gcc compiler and a subset of GNU tools to the MSP430 platform. As noted above, mspgcc version 3.2.3 was used.

Metrics

This section describes an accurate method for measuring the following parameters of interest: RAM, ROM and Speed.

ROM

ROM—or code memory—is the flash memory or other nonvolatile memory used by the program when it is loaded onto the MCU. This is the most straightforward parameter to measure. When the C code is compiled, the compiler generates several segments. The TEXT segment contains executable instructions and global constants and is loaded into the MCU's ROM. The size of each segment and its target physical address can be obtained using the msp430-objdump utility. The metric of interest is the code memory used by the AES implementation only and not the whole program which includes the main( ) function with the code to initialize the MCU and call the encryption/decryption functions. This metric is obtained by compiling the test code without the encryption/decryption code to obtain the size contributed by the main function, and then subtracting this from the size of the TEXT segment of the original test code. This value is the best estimate of the ROM requirement of the AES module.

RAM

RAM—or data memory—refers to the volatile, high-speed onboard memory of the MCU. This resource is extremely limited on most embedded systems. It is also hard to measure because, in addition to global variables, one also needs to take into account the variable stack size. Accurately measuring the stack size has been a difficult challenge for embedded systems developers. Yet it is important because bugs resulting from stack overflows are unpredictable and hard to find. The inventors chose a very accurate and reliable method that tends to be somewhat involved. The steps required to calculate the stack size are given below:

1. Compile the code with the -g option to include debugging information for use by msp430-gdb (MSP430 port of the GNU debugger)
2. Load the code on the MCU through msp430-gdb using the JTAG interface for real-time debugging
3. Using msp430-gdb, set break points at the start of each function
4. Set a watch for register 1 of the MSP430 microcontroller. Register 1 is used as the Stack Pointer (SP)
5. Run the program and keep track of the minimum value of SP. This is because the stack always grows up, thus the minimum value of SP would give us the maximum size of the stack
6. Subtract the minimum value of the stack from the value of SP at the main( ) function to get the stack depth of AES After obtaining a value for the maximum depth of the stack, one can add the size of the DATA segment and the BSS segment to account for initialized and uninitialized global variables.

Software Encryption Speed

Software encryption speed is the number of bits of plaintext data that can be encrypted per second. Since the time to encrypt a single block of plaintext is on the order of microseconds, it is important to rely on a method that can measure at this resolution. To avoid any interference, the disclosed code is executed in a standalone mode without any underlying operating system on the msp430 and without the possibility of interruption.

The measurement method involves using the digital output pins of the MCU to set pins high just before initiating the encryption process and set it low just after completion. An Agilent DSO3202A oscilloscope, which is capable of sampling voltage at a rate of 2 giga-samples per second, is used to record the square wave generated by the output pin going high and low, and the auto-measure feature of the scope is used to measure the time when the digital output pin remained high. The method used an infinite loop which encrypted and decrypted a block of data. For AES, a single block is 128 bits in size. The disclosed code sets the output pin high during encryption and low during decryption. Table 3 specifies the scale settings used for the measurements and the accuracy of each setting. This time measurement technique is also used to measure the time taken by the AES key expansion process and the CC2420 transmission rate.

TABLE 3

Oscilloscope Scale Settings and Accuracy

| Scale | Accuracy |
|---|---|
| 100 μs/division | ±1 μs |
| 200 μs/division | ±2 μs |
| 500 μs/division | ±5 μs |

CC2420 Hardware Encryption Speed

Measurement of the speed of encryption performed on the CC2420 chip is limited by the interface it provides to the microcontroller. Though the CC2420 supports a serial clock of up to 10 MHz, the clock rate is limited to 4 MHz by the MSP430 SPI (Serial Peripheral Interface) master mode. However, a serial clock of 4 MHz allows interaction with the CC2420 at a rate of 4 Mbps, which is much higher than the radio transmission rate of 250 kbps. Therefore, the serial link is not perceived to be a major performance bottleneck.

Similar to the timing method used for software encryption, the method for measuring hardware encryption speed uses digital output pins of the MSP430 and an oscilloscope to measure time. Using the CC2420 hardware module involves multiple steps:

1. Writing to the CC2420 RAM
2. Issuing the encrypt command to the CC2420
3. Wait for encryption module to complete processing by requesting status byte
4. Read from the CC2420 RAM Though step 3 alone accounts for the time spent on encryption by the CC2420 hardware module, all of the steps listed above are factored in to get an application-level estimate of encryption time. Note that the characteristics of the CC2420 are evaluated in standalone encryption mode only, on the assumption that the circuitry used in standalone mode is the same as the circuitry used in inline mode. The CC2420 is not capable of performing decryption in standalone mode, so the results are limited to encryption only.

Results

Effects of Implementations

Figure 5:
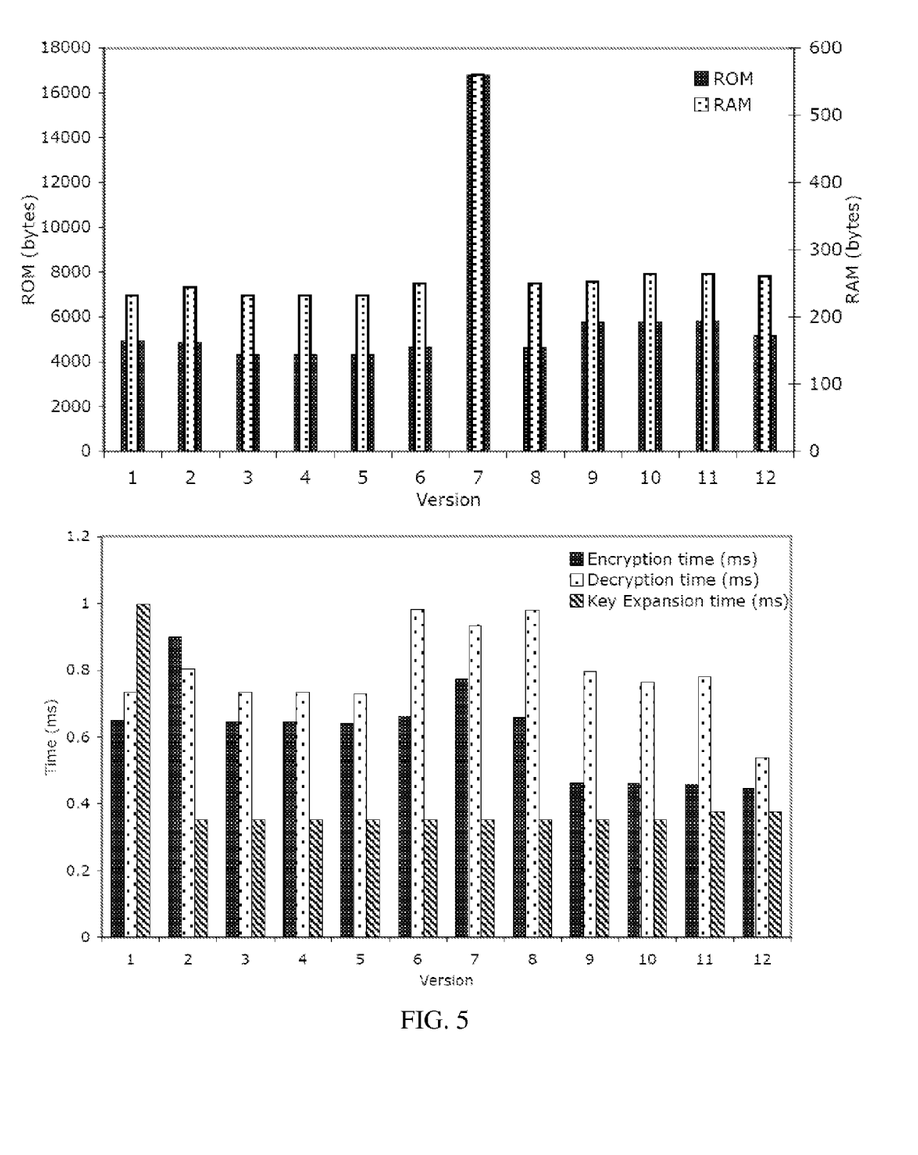
FIG. 5 is a pair of bar graphs illustrating the effect of optimizations on encryption speed and on ROM and RAM usage. Version numbers are described in Table 4.
Figure 6:
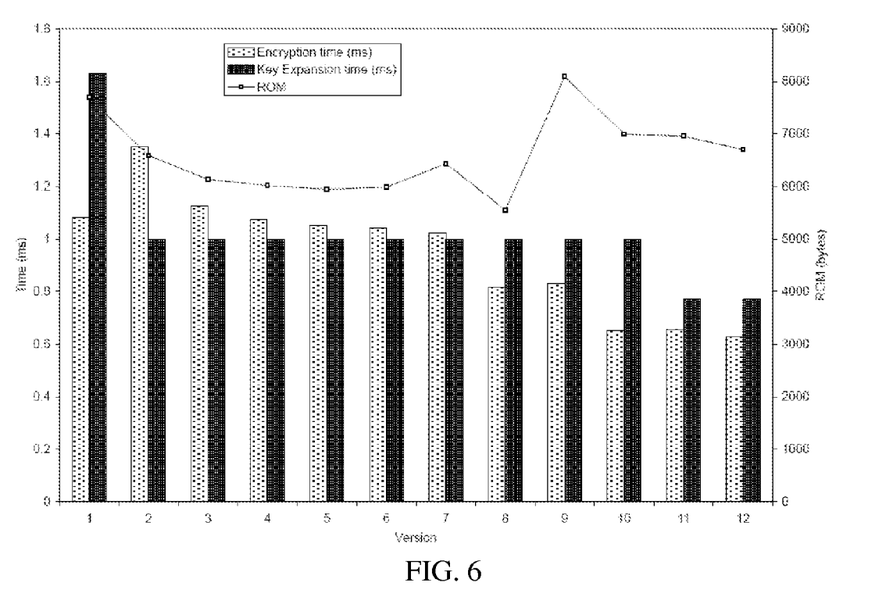
FIG. 6 is a bar graph illustrating the effect of optimizations on encryption speed and code size without the use of the msp-gcc 03 option, for the same versions as in FIG. 5.

Table 4 indicates various combinations of optimizations tested, and FIG. 5 shows the effects of the optimization techniques on performance, RAM and ROM with the O3 compiler option. FIG. 6 shows similar metrics without the O3 option. Source code for the versions identified in Table 4 is included in the Appendix.

TABLE 4

Optimizations associated with version number of each implementation. All versions compiled with —O3 option provided by msp-gcc

| Version | Optimizations applied |
|---|---|
| 1 | NONE |
| 2 | SPECIAL, DATASZ(8-bits) |
| 3 | SPECIAL, DATASZ(16-bits) |
| 4 | SPECIAL, DATASZ(32-bits) |
| 5 | SPECIAL, DATASZ(64-bits) |
| 6 | SPECIAL, DATASZ(64-bits), MIX16 |
| 7 | SPECIAL, DATASZ(64-bits), MIX16, UNROLL |
| 8 | SPECIAL, DATASZ(64-bits), MIX16, INLINE |
| 9 | SPECIAL, DATASZ(64-bits), MIX16, INLINE, REDMEM |
| 10 | SPECIAL, DATASZ(64-bits), MIX16, INLINE, REDMEM, LOCBUF |
| 11 | SPECIAL, DATASZ(64-bits), MIX16, INLINE, REDMEM, LOCBUF, GLOB |
| 12 | SPECIAL, DATASZ(64-bits), INLINE, REDMEM, LOCBUF, GLOB |

Specialization of Code (SPECIAL)

Modifying the generic baseline implementation and making it specialized for AES-128 reduced the code size from 4942 to 4316 bytes. Due to the elimination of conditional constructs that accommodated the key expansion for different key sizes, a performance improvement of 183.52% is seen in the key expansion process. Since the RAM size depends on the maximum depth of the stack, it is not affected by the key expansion process which happens before the encryption process that has a much greater stack requirement.

Varying Data Type Size (DATASZ)

Moving from 8-bit types to 16-bit types has a huge performance benefit of 39.53% due to the use of a 16-bit microcontroller. There is also a drop in code size from 4882 to 4314 bytes and RAM size from 244 to 232 bytes.

The mspgcc compiler also supports 32-bit and 64-bit types. On testing with these sizes, the gain in speed is negligible. However, on testing the same variations without the compiler optimization flag, there is a more noticeable difference. Without the O3 flag, in moving from 16-bit to 64-bit types, the speed increased by 7.03% while the ROM decreased from 6138 to 5950 bytes. This shows that the compiler optimizations work well to speed up the AddRoundKey transformation.

Loop Unrolling (UNROLL)

When the O3 compiler optimization is selected, the compiler automatically tries to perform loop unrolling as well as function inlining. Manually unrolling the loop when the O3 compiler optimization was selected had a negative impact on RAM, ROM and speed. The RAM increased by more than 2.2 times and the code size increased by more than 3.61 times. The speed also decreased by 14.73%.

This effect of loop unrolling is counter-intuitive and is due to the compiler's inability to determine which portions of code need to be optimized. This has been verified by applying manual loop unrolling without the use of O3 and observing a slight increase of 2.15% in speed and a 452 byte increase in code size.

Function Inlining (INLINE)

As mentioned before, O3 directs the compiler to attempt function inlining on the entire code. Therefore, compiling the source code with O3 with manual function inlining only gave a negligible advantage. To evaluate the advantage gained due to function inlining, the source code was compiled without O3, resulting in an increase of 20.55% in speed without sacrificing code space. This is because each transformation is called only once within the main loop which iterates through the rounds.

Reducing Memory Moves (REDMEM)

Reducing movement of data from one buffer to the other during the encryption process resulted in a 42.12% increase in performance, but also increased the code size significantly by 1134 bytes.

Reducing memory moves without the use of compiler optimizations produced a decrease in performance. This is because the compiler optimization enforces the use of more direct memory addressing which results in faster array accesses.

Eliminate Local Function Buffers (LOCBUF)

Use of a local buffer for the state within a function resulted in only a slight increase in performance, code size and RAM. This was again due to the effect of O3 which optimizes memory accesses using pointers. Without the use of O3, there is a more significant increase of 27.30% in performance and a decrease of 1096 bytes in code size.

Use of Global Variables (GLOB)

Storing the entire key schedule in a global variable hurt the performance of the key expansion process by 6.38% and resulted in a negligible improvement in encryption time. Again, without the use of O3, use of global key schedule improved key expansion performance significantly by 29.27%. This shows that the compiler is also effective at optimizing memory accesses for global variables.

On-the-Fly-Key Generation (OTFK)

Generating keys on-the-fly saves 160 bytes of RAM. This represents a key trade-off between performance and RAM usage. Performance is hurt only when encrypting multiple blocks as the round keys are recalculated for each block. This design choice largely depends on the size of the plaintext data to be encrypted using a single key.

16-bitMemoryWrites in MixColumns (MIX16)

When compiled with the O3 option, using an 8-bit shift and or operation to generate a 16-bit value to write to RAM instead of writing two 8-bit values hurt performance by 2.22%. However, without the use of compiler optimizations, the performance showed a slight improvement. This shows that the compiler optimizes memory writes enough to make the use of 16-bit writes unnecessary.

Overall, the following (Version 12 in Table 4) is presently the most preferred combination of optimizations:
SPECIAL
DATASZ (64-bits)
INLINE
LOCBUF
REDMEM
GLOB
Using the msp430-gcc compiler at the O3 optimization level boosts performance by an additional 40.49%.

OTFK can be used on top of the above optimizations in cases where it is important to use minimal amount of RAM and the size of the plaintext data to be encrypted with a single key is not too large. If however, the data to be encrypted is large, then to prevent data replay attacks, different keys will have to be used anyway and therefore OTFK is less useful.

Using the above optimizations, i.e., Version 12 with O3 and OTFK, the inventors achieved an encryption speed of 286.35 kbps, RAM requirement of 260 bytes and a code size of 5160 bytes.

Comparison with Other Implementations

FIG. 7 shows how the fastest implementation (Version 12) compares to previous attempts at optimizing AES on a similar platform. The timing measurements for each implementation differ slightly from the published values as each implementation was compiled and tested on the platform disclosed herein. The implementation of the present invention is seen to provide a significant improvement of 104.02% in encryption speed, 12.5% in key expansion and an overall improvement of 84.69% over the previous best performing implementation.

TABLE 5

Information about implementations compared in FIG. 7.
Measured ROM usage is taken from the reference implementation code used by the inventors, compiled with —O3 optimizations.
Published ROM usage is taken directly from each published reference.

| Implementation | Reference paper | Measured ROM Usage | Published ROM Usage |
|---|---|---|---|
| 1 | [6] | 5968 bytes | n/a |
| 2 | [12] | 6780 bytes | 2616 bytes |
| 3 | [14] | 6848 bytes | 3322 bytes |
| 4 | [10] | n/a | n/a |
| 5 | Version 12 | 5160 bytes | n/a |

Additionally, Table 5 compares ROM usage among other implementations. The implementation of the present invention has the smallest ROM usage of all the empirically measured code sizes, 5160 bytes. Note that implementation 3 lists a smaller published ROM size, due most likely to the use of the −O3 compiler optimizations for the measured values discussed herein.

RAM usage was similar among all implementations, and depends largely on whether keys are generated on the fly or pre-computed. Additionally, it is not clear how RAM usage was measured in other published implementations, especially with regard to stack usage.

Comparison with Hardware Implementation

TABLE 6

Time taken to complete each step required to encrypt using the CC2420 hardware AES module

| Process | Time (μs) |
|---|---|
| Writing to the CC2420 RAM | 94.40 |
| Issuing the encrypt/decrypt command to the CC2420 | 6.40 |
| Wait for encryption module to complete processing by requesting status byte | 18.40 |
| Read from the CC2420 RAM | 102.40 |

Table 6 shows the time taken to encrypt using the CC2420 AES module. As expected, the hardware module is much faster than AES in software. This high speed of encryption does not directly translate into a better performing WSN since the limiting factor of the network is the radio communication rate. As described above, AES in software can exceed the maximum specified rate of 250 kbps of IEEE 802.15.4-compliant WSNs. However, using the hardware module for data encryption does free up the microprocessor for a few milliseconds which can be used for other tasks. In a system where performance is crucial, allocating encryption to the CC2420 hardware and efficiently using microprocessor resources can result in slightly better performance.

A major disadvantage of using hardware AES is its lack of flexibility. Though AES-128 is sufficiently secure, security schemes are regularly evaluated and updated to ensure that they are not susceptible to newly developed attacks. In [8], NIST acknowledges that the widely used cipher-based authentication mode, CBC-MAC, has security deficiencies and details a specification for the CMAC mode. The CC2420 implements AES-based authentication using the CBC-MAC mode of operation, and its hardware implementation presumably suffers from these deficiencies. Therefore, relying on hardware for security is a concern for secure sensor networks.

CONCLUSIONS

Those skilled in the art will appreciate from the foregoing that embodiments of the present invention make it possible for an optimized C implementation of AES encryption-decryption to match the communication speed of a Zigbee radio. It has been shown that an optimized AES implementation in accordance with the present invention outperforms all previous implementations.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected. The following references are provided for further background.

REFERENCES

[1] Eyes project. http://www.eyes.eu.org/.
[2] Moteiv corportation. http://www.moteiv.com/.
[3] Softbaugh, inc. http://www.softbaugh.com/.
[4] Advanced Encryption Standard (AES), FIPS PUB 197, November 2001.
[5] IEEE Standard for Information technology-Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (WPANs), IEEE Standard 802.15.4-2006, September 2006.
[6] D.-R. Duh, T.-C. Lin, C.-H. Tung, and S.-J. Chan. An implementation of aes algorithm with the multiple spaces random key pre-distribution scheme on mote-kit 5040. In SUTC '06: Proceedings of the IEEE International Conference on Sensor Networks, Ubiquitous, and Trustworthy Computing—Vol 2—Workshops, pages 64-71, Washington, D.C., USA, 2006. IEEE Computer Society.
[7] M. Dworkin. Recommendation for Block Cipher Modes of Operation: Methods and Techniques. National Institute of Standards and Technology, December 2001.
[8] M. Dworkin. Recommendation for Block Cipher Modes of Operation: The CMAC Mode for Authentication. National Institute of Standards and Technology, May 2005.
[9] B. Gladman. Brian Gladman's AES implementation. http://fp.gladman.plus.com/AES/index.htm.
[10] T. Instruments. Z-stack: Zigbee protocol stack from Texas instruments, 2008.
[11] S. Karthikeyani. IEEE 802.15.4™ and ZigBee™ Hardware Platform using MSP430F1612. Texas Instruments, September 2005.
[12] Y. W. Law, J. Doumen, and P. Hartel. Survey and benchmark of block ciphers for wireless sensor networks. ACM Trans. Sen. Netw., 2(1):65-93, 2006.
[13] A. J. Menezes, P. C. van Oorschot, and S. A. Vanstone. Handbook of Applied Cryptography. CRC Press, 2001.

[14] A. Vitaletti and G. Palombizio. Rijndael for sensor networks: Is speed the main issue? Electron. Notes Theor. Comput. Sci., 171(1):71-81, 2007.

We claim:

1. A low-power secure communication device, comprising:
   a ZigBee-compliant transceiver having an over-the-air data rate limited to approximately 250 kbps; and
   a 16-bit RISC encryption processor configured to implement a modified Advanced Encryption Standard (AES) algorithm, wherein said modified AES algorithm encrypts data at a rate at least as high as said data rate of said transceiver, said modified AES algorithm including function inlining, reducing memory moves by combining multiple AES transformations on a given state during a given iteration of a main loop of said modified AES algorithm, pointer-based accessing of said state from a transformation function, and storing an expanded global key schedule in a global variable.

2. The communication device of claim 1, wherein said encryption processor includes ROM and RAM and uses at most approximately 5000 bytes of said ROM and approximately 250 bytes of said RAM to implement said modified AES algorithm.

3. The communication device of claim 2, wherein said encryption processor is configured to implement a low-resource AES algorithm having a key size of less than 200 bits and at least a 16-bit data type.

4. The communication device of claim 3, wherein said data rate of said transceiver is approximately 250 kbps.

5. The communication device of claim 1, wherein said encryption processor is configured to implement a low-resource AES algorithm having a key size of less than 200 bits and at least a 16-bit data type.

* * * * *